Dec. 7, 1926.
G. A. CALHOUN
1,609,399
AUTOMOBILE LIGHT
Filed July 27, 1922      2 Sheets-Sheet 1
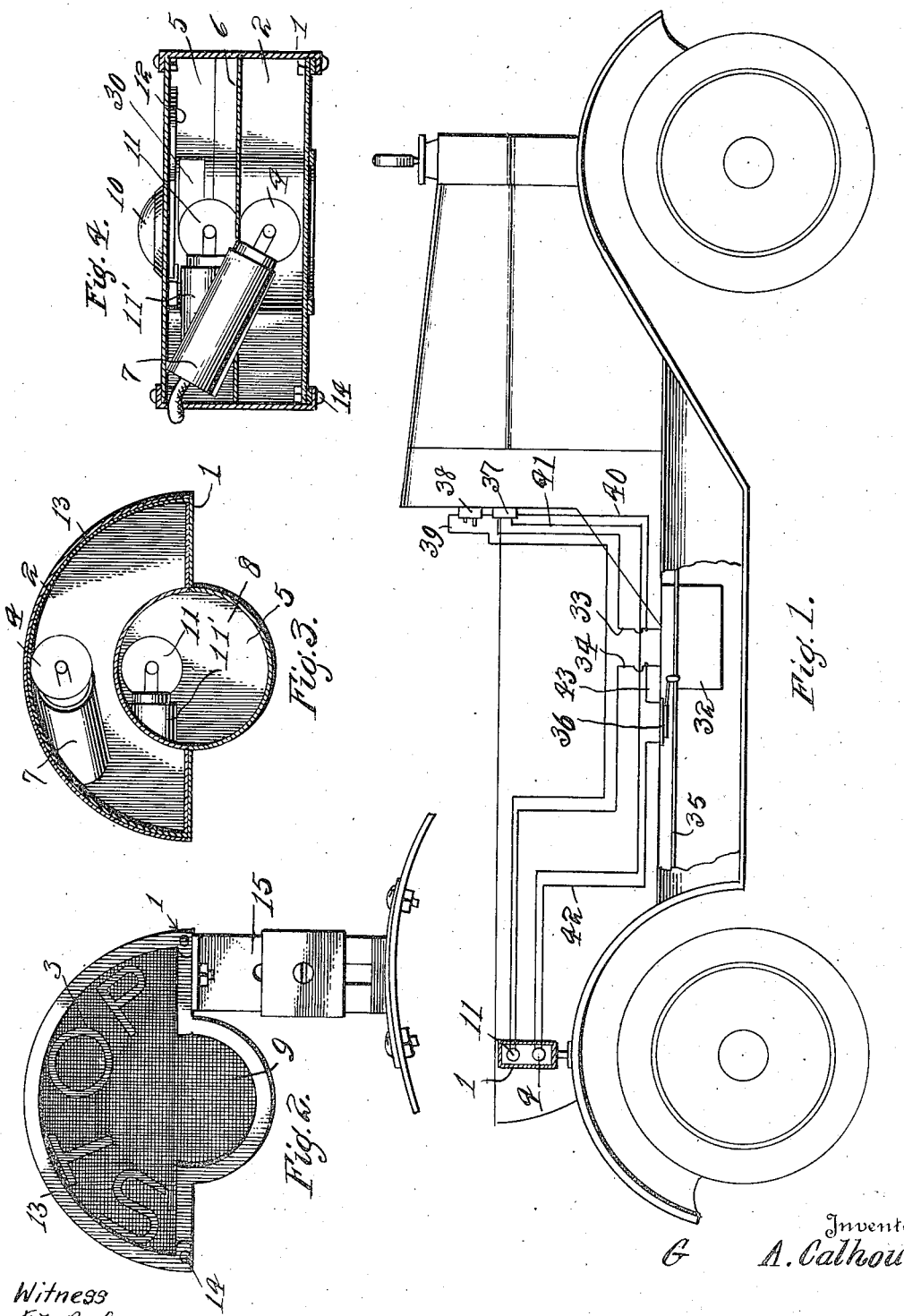

Dec. 7, 1926.
G. A. CALHOUN
1,609,399
AUTOMOBILE LIGHT
Filed July 27, 1922      2 Sheets-Sheet 2
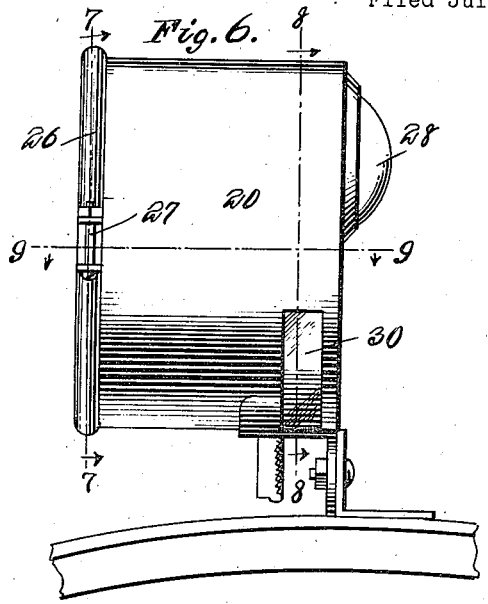
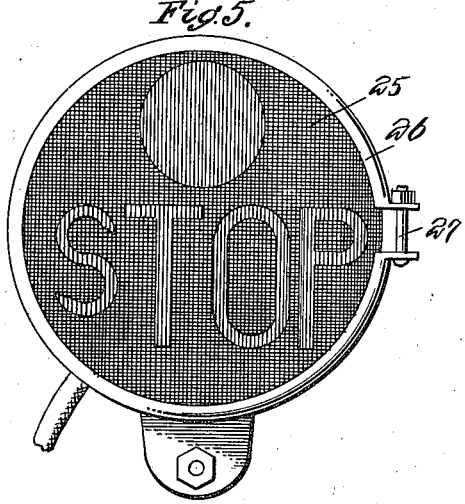
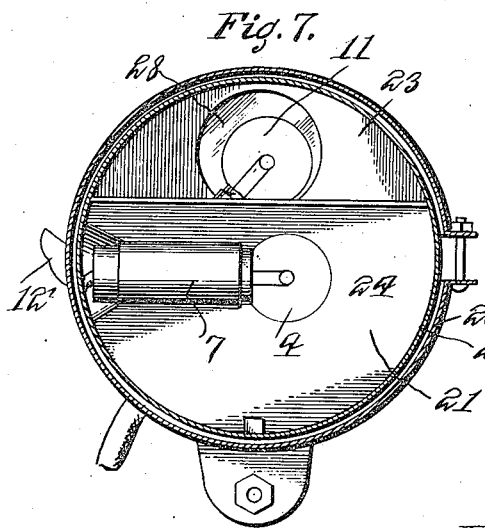
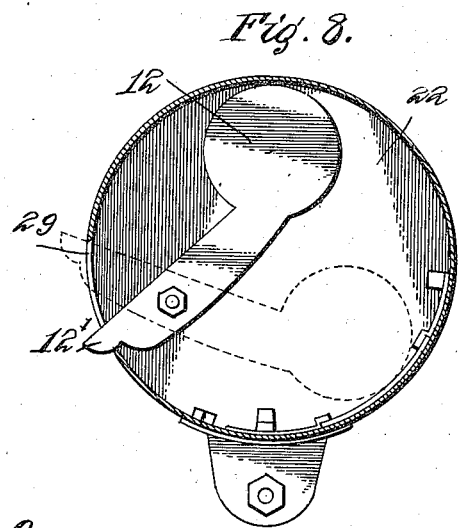
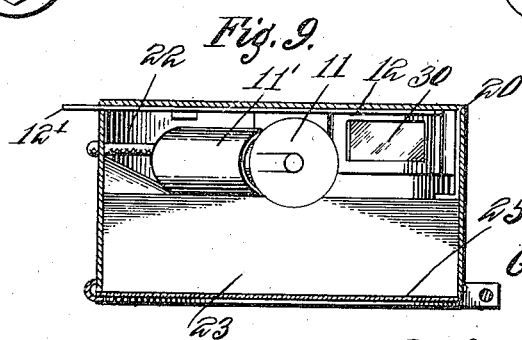
Inventor
A. Calhoun
By Richard B. Owen,
Attorney Patented Dec. 7, 1926.

1,609,399

UNITED STATES PATENT OFFICE.

GEORGE A. CALHOUN, OF CLAIRTON, PENNSYLVANIA.

AUTOMOBILE LIGHT.

Application filed July 27, 1922. Serial No. 577,916.

The present invention relates to an automobile light having for its principal object to embody a structure including a signal, a tail light and a parking light.

Another important object of the invention is to provide means for shutting off the rays of light from the parking lights when the automobile is in motion.

Another object of the invention is to provide a stop signal operable upon actuation of the brake of the automobile.

With the above and numerous other objects in view as will appear as the description progresses, the invention resides in certain novel features of construction, and the combination and arrangement of parts as will be hereinafter more fully described and claimed.

In the drawings:—

Figure 1 is a diagram of the wiring used with this device showing the same as applied to an automobile, Figure 2 is a front elevation of one form of the light housing, Figure 3 is a vertical section therethrough, Figure 4 is a horizontal transverse section therethrough, Figure 5 is a front elevation of another form of the housing, Figure 6 is a side elevation thereof, Figures 7, 8 and 9 are sections taken substantially on the lines 7—7, 8—8, and 9—9 of Figure 6.

Referring to the drawing in detail it will be seen that the housing is provided with a signal compartment 2 having in its front a transparent colored panel 3 preferably provided with the word "Stop" written therein so as to be plainly seen when the electric bulb 4 situated in the compartment 2 is illuminated. A second compartment 5 is situated alongside of the first compartment 2 and is separated therefrom by the partition 6 through which extends the electric socket 7 that supports the bulb 4. The compartment 5 extends below the compartment 2 being provided with the extension 8 which is provided at its front end with a panel 9 and at its other end with a bull's eye or panel 10. An electric bulb 11 mounted in a socket 11′ situated in the compartment 5 furnishes light for these panels 9 and 10. A shutter 12 is pivotally mounted within the compartment 5 and is adapted to be operated for shutting off the light through the panel 10. When this shutter 12 is in an open or non-registering position with the panel 10 the device acts as an ordinary parking light being seen from the front and rear of the vehicle but when the shutter 12 registers with the panel 10 the device acts as an ordinary tail light being visible from the rear only.

The top 13 is movable and is held in place by the screws 14 so that ready access may be had to the interior of the two compartments such as will be found necessary from time to time in removing the bulbs 4 and 11. The housing 1 is carried upon a bracket 15 which is preferably attached to a rear mud guard of the automobile.

In the modification shown in Figures 5 to 9 inclusive the housing 20 is constructed with the signal compartment 21 and the other compartment 22 which is provided with an extension at its top 23 that extends over the compartment 21, these two compartments being separated by the partition 24. The bulb 4 lights the compartment 21 and is mounted in a socket 7 while the bulb 11 lights the compartment 22 and is mounted in a socket 11′. A panel of colored glass 25 is mounted on the open end of the housing being held in place by the clamp band 26 the ends of which are drawn together by the bolts 27. A panel 28 is mounted in the rear wall of the housing 20 opposite the extension 23 of the compartment 22 and a shutter 12 is pivotally mounted in the compartment 22 and adapted to be placed in registry with the panel 28 so as to shut the light therefrom when desired. It is to be noted that this shutter 12 has an extension 12′ operable from the exterior of the housing being extended through a slot 29 provided therein. The word "Stop" is preferably written on the panel 25 so as to register with the compartment 21 so as to be easily read upon illumination of the bulb 4.

In both modifications it is to be noted that the tail light compartments 5 and 22 are provided adjacent their lower ends with openings 7 covered by transparent panels 30 so that light will be directed downwardly for illuminating a license plate usually carried upon automobiles.

Particular attention is now called to Figure 1 wherein it will be seen that a battery 32 is provided having the positive and negative leads 33 and 34. A brake rod is shown at 35 and is adapted to actuate a switch 36.

The parking light is illuminated by the current passing from the battery 32 through the lead 33, through ammeter 37 through the switch 38, through the wire 39 through the bulb 11 and returned to the battery through the lead 34. When the switch 36 is closed the current passes through the lead 33, wire 40, ammeter 37, wire 41, through the bulb 4, and returns to the battery through the wire 42, switch 36, wire 43 and lead 34.

It is thought that the construction and operation of the device will be readily understood without a more detailed description thereof. It is to be understood that the present disclosure of the invention merely relates to the preferred embodiments thereof and that numerous changes may be resorted to within the scope of the invention without departing from the spirit thereof.

Having thus described my invention what I claim as new is:—

1. A vehicle lamp including an opaque casing open at its rear end and having a front wall, a transverse partition having a vertical portion dividing a portion of the casing into front and rear compartments, said partition including a horizontal portion extending to the rear end of the casing whereby a portion of the front compartment has an extension leading to the rear end of the casing, a transparent panel closing the rear end of the casing and having signalling indicia thereon opposite the rear compartment and warning color opposite the extension of the front compartment, the front wall of the casing having an opening opposite the extension of the front compartment and covered by an un-colored lens, a source of light in each compartment, and a vertically swinging opaque shutter pivoted within the casing and manually operable to cover or uncover said lens-covered opening at will without affecting the passage of light through the rear panel, whereby the lamp may be employed as a stop signal, tail light and parking light.

2. A vehicle lamp including an opaque casing open at its rear end and having an opaque front wall, an opaque transverse partition having a vertical lower portion dividing the lower portion of the casing into front and rear compartments, said partition including a horizontal upper portion extending to the rear end of the casing whereby a portion of the front compartment has an extension leading to the rear end of the casing over the rear compartment, a transparent panel closing the rear end of the casing and having signalling indicia thereon opposite the rear compartment and warning color opposite the extension of the front compartment, the front wall of the casing having an opening opposite the extension of the front compartment and covered by an un-colored lens, and a source of light in each compartment.

In testimony whereof I affix my signature.

GEORGE A. CALHOUN.